United States Patent [19]

Ninomiya

[11] Patent Number: 5,417,637
[45] Date of Patent: May 23, 1995

[54] KNIFE CHANGING METHOD IN A VENEER LATHE

[75] Inventor: Michito Ninomiya, Obu, Japan

[73] Assignee: Meinan Machinery Works, Inc., Obu, Japan

[21] Appl. No.: 183,179

[22] Filed: Jan. 18, 1994

[51] Int. Cl.⁶ .............................................. B23Q 3/155
[52] U.S. Cl. ..................... 483/1; 144/209 R; 144/212; 144/379; 483/25; 483/26
[58] Field of Search ........... 144/2 R, 114, 117, 209 R, 144/212, 213, 329; 483/1, 25, 26, 29

[56] References Cited

U.S. PATENT DOCUMENTS

| | | | |
|---|---|---|---|
| 3,006,392 | 10/1961 | Elford | 144/212 |
| 3,603,186 | 9/1971 | Vigor | 144/212 |
| 4,034,867 | 7/1977 | Akagawa | 483/26 |
| 4,842,029 | 6/1989 | De Abreu | 144/117 R |
| 4,946,399 | 8/1990 | Kawashima | 439/752 |
| 5,217,423 | 6/1993 | De Dompierre | 483/1 |
| 5,232,380 | 8/1993 | Inoue et al. | 439/610 |

FOREIGN PATENT DOCUMENTS 41-3437  6/1966  Japan .

Primary Examiner—W. Donald Bray
Attorney, Agent, or Firm—Brooks Haidt Haffner & Delahunty

[57] ABSTRACT

A knife changing method is disclosed which is applicable to a veneer lathe equipped with a knife carriage to which a veneer peeling knife is clamped with its cutting edge set at a predetermined elevation relative to the knife carriage. The knife carriage is shiftable to at least one knife changing position and the lathe has formed in at least one of its side frames a knife passage adjacent the knife changing position of the carriage. In the knife changing operation, the knife carriage is firstly shifted to its knife changing position, where an old knife is released from the knife carriage by undoing knife clamps. The freed knife is laterally moved away from the veneer lathe through the knife passage in the side frame. Then, a new, or reground knife is moved laterally into the veneer lathe through the knife passage to a predetermined knife installing position on the knife carriage, where the new knife is fixed to the carriage by activating the knife clamps. In moving the old knife away from the veneer lathe, it is firstly removed laterally from the knife carriage and then withdrawn laterally out of the veneer lathe. In moving the new knife into the veneer lathe, it is firstly inserted laterally into the veneer lathe and then moved laterally to the knife installing position on the knife carriage.

20 Claims, 12 Drawing Sheets

KNIFE CHANGING METHOD IN A VENEER LATHE

FIELD OF THE INVENTION

The present invention relates to a method of changing a veneer peeling knife in a veneer lathe. More specifically, it relates to a knife changing method in a veneer lathe equipped with a knife carriage to which the veneer peeling knife is fixed with its cutting edge set at a predetermined elevation with respect to the knife carriage.

BACKGROUND OF THE INVENTION

According to a conventional practice of changing a worn veneer peeling knife of a veneer lathe with a new reground one, firstly the knife carriage of the lathe is moved to any position suitable for the knife changing operation and the old knife is released from its clamps. Then, the knife is lifted off the carriage obliquely upward by using any power equipment such as crane and brought to any position outside the lathe. Alternatively, if the released knife is light enough in weight to handle manually, it may be removed by hand from the knife carriage and placed in front thereof temporarily until it is transferred out of the lathe by means of any power equipment. Then, a new knife is transported to the knife carriage and set in place in the knife carriage by using the steps of procedure reverse to the above knife removing.

According to this conventional knife changing method, it is necessary for workmen or maintenance personnel to enter into the veneer lathe regardless of whether the knife is to be changed manually or by using any lifting equipment. However, the top surface of the lathe bed where the workmen do their necessary job is usually messed with wood chips and pieces and other foreign matter which hinder the knife changing operation by the workmen. Furthermore, because there is peripheral equipment such as a log charger, log centering device, etc. adjacent the knife carriage, the freedom of working in the veneer lathe is restricted, so that working efficiency is affected.

SUMMARY OF THE INVENTION

Therefore, it is an object of the present invention to provide a knife changing method that can solve the above-mentioned problems associated with the conventional knife changing method.

According to the invention, there is provided a knife changing method which is applicable to a veneer lathe equipped with a knife carriage having a veneer peeling knife clamped thereto. The knife itself is held by a knife holder with the cutting edge set at a predetermined elevation with respect to its holder and clamped therewith to the knife carriage so that the cutting edge of the knife is placed at a given elevation relative to the knife carriage. The knife carriage is shiftable to at least one knife changing position and the lathe has formed therein at least one knife passage adjacent the knife changing position of the carriage. According to the knife changing method of the invention, the knife carriage is firstly shifted to its knife changing position, where the knife assembly, i.e. the knife and its holder, is released from the knife carriage by undoing knife clamps, thus the same knife assembly being placed at a predetermined position relative to the knife carriage. The freed knife assembly is laterally moved away from the veneer lathe through the knife passage. Then, another knife assembly carrying a new ground knife is moved laterally into the veneer lathe through the knife passage to the above predetermined position on the knife carriage, where the knife assembly is ready to be fixed to the knife carriage by activating the knife clamps. In the above movement of the knife assembly away from the veneer lathe, the released knife assembly is firstly removed laterally from the knife carriage and then it is withdrawn laterally out of the veneer lathe. On the other hand, the movement of the new knife assembly into the veneer lathe includes firstly inserting the knife assembly laterally into the veneer lathe and then moving the same knife assembly laterally as far as to the aforementioned predetermined position on the knife carriage. The knife changing method according to the invention may be performed by using a knife changing apparatus disposed outside the veneer lathe.

In one preferred embodiment of the knife changing method, the knife carriage is adapted to be shiftable between first and second positions and the veneer lathe has an access opening in one side thereof, e.g. in a side frame. In this method, the released knife assembly is moved laterally away from the veneer lathe through the access opening with the knife carriage previously placed at its first or knife removing position, while the new knife assembly is moved into the veneer lathe through the same opening with the knife carriage then shifted to its second or knife installing position. Knife passages, through which the old and new knife assemblies are moved respectively, are provided in the access opening in the side frame of the lathe.

According to another preferred embodiment of the invention, the knife carriage is movable to a single knife changing position and a knife changing apparatus is provided adjacent a side frame of the veneer lathe which is shiftable between its knife removing and inserting positions as required.

In still another preferred embodiment, the knife carriage is locatable at a single knife changing position and the veneer lathe has access openings formed in the opposite side frames thereof through which a knife assembly may pass. In this method, knife changing can be accomplished by inserting a new knife assembly into the veneer lathe through the opening in one side frame and an old knife assembly is removed therefrom through the opening in the other side frame.

The present invention also provides helpful means for cleaning knife installation surfaces of the knife carriage. The cleaning means, which can provide a sweeping effect to the knife installation surfaces for removing wood chips, pieces and other debris on the surfaces, is attached at the leading end of the knife assembly as viewed in its inserting movement into the veneer lathe. Such knife assembly may be used advantageously after any desired number of times of knife changing.

The above and other objects, features and advantages of the invention will become apparent to those skilled in the art from the following description of embodiments of the knife changing method according to the present invention, which description is made with reference to the accompanying drawings, wherein:

DETAILED DESCRIPTION OF PREFERRED EMBODIMENTS

The following will describe preferred embodiments of the knife changing method in a veneer lathe according to the present invention with reference to the accompanying drawings. It is noted that the veneer lathe in which the method is performed is illustrated in a simplified form and that some peripheral equipment of the lathe are omitted from the illustration and the following description for the sake of clarity.

FIRST EMBODIMENT

Figure 1:
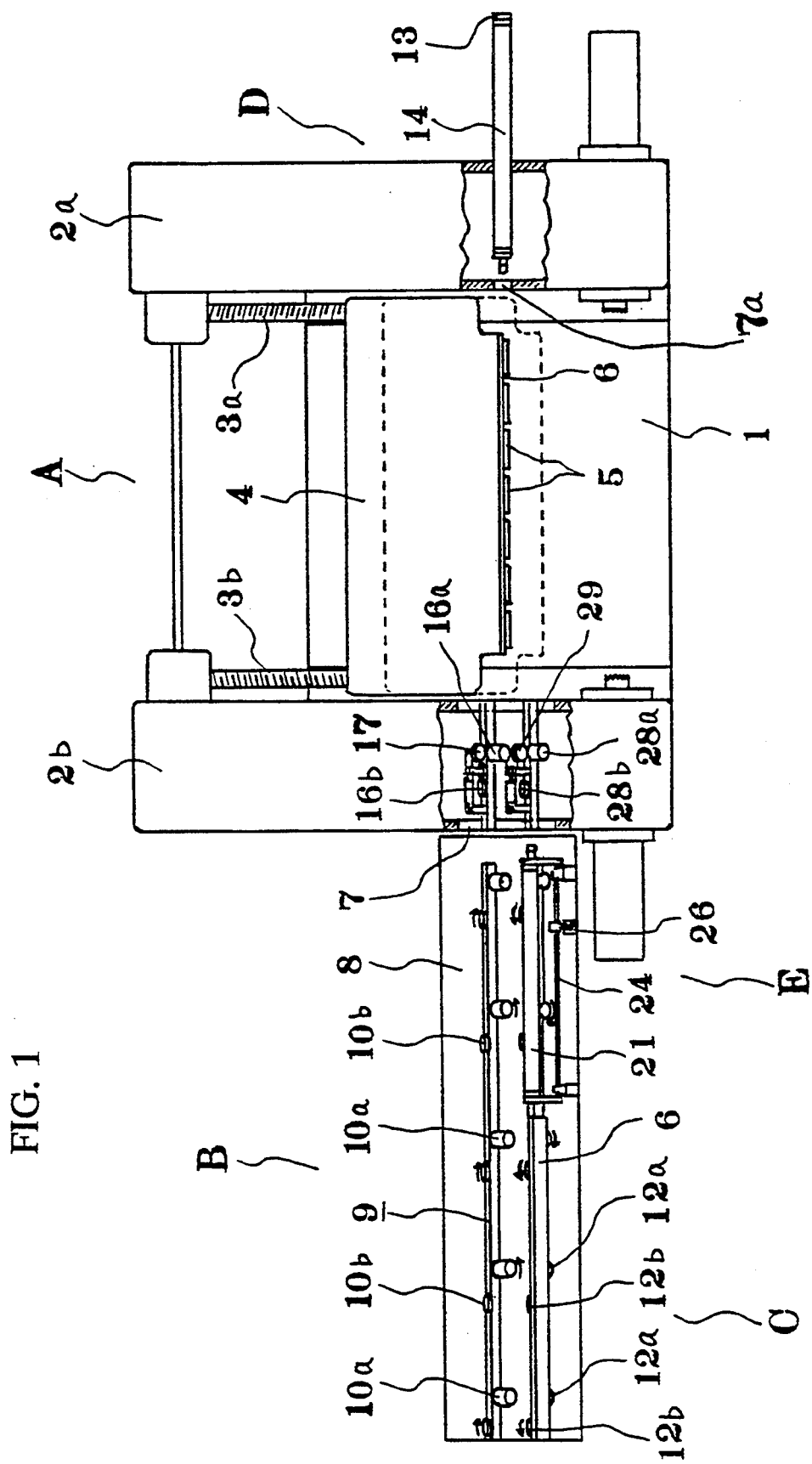
FIG. 1 is a plan view of a veneer lathe and a knife changing apparatus which are used in performing the method according to the first preferred embodiment of the present invention.
Figure 2:
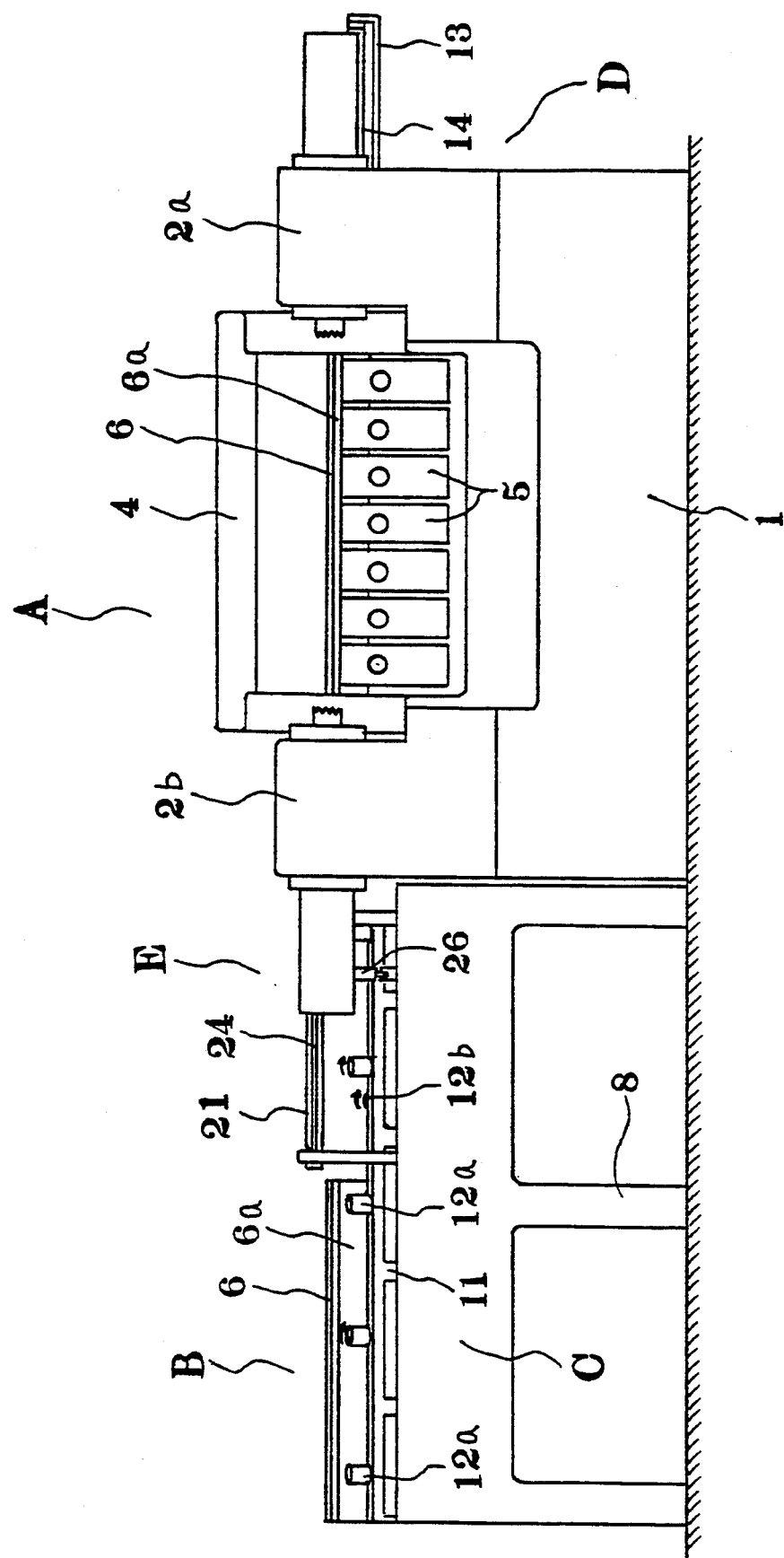
FIG. 2 is a front view of the veneer lathe and the knife changer of FIG. 1.
Figure 3:
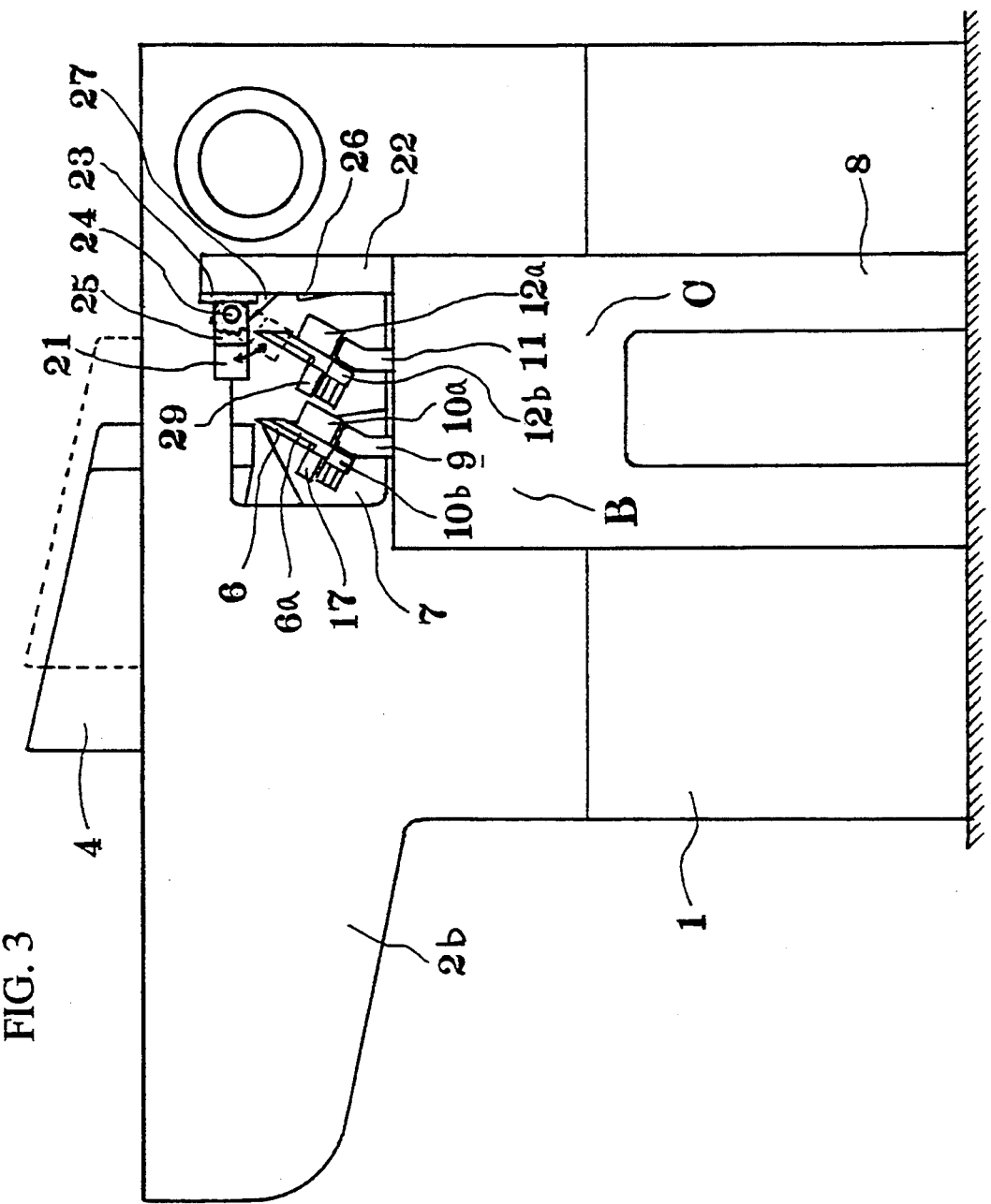
FIG. 3 is a partial end view of the veneer lathe and the knife changer of FIG. 1.

Referring to FIGS. 1 to 5, a first embodiment of the knife changing method will be explained. There is provided a veneer lathe which is designated generally by reference symbol A, comprising a bed 1, a pair of side frames 2a, 2b, a pair of rotatable lead screws 3a, 3b, a knife carriage 4 movable to and fro by rotation of the lead screws, and a veneer peeling knife 6 carried by the knife carriage 4 and secured thereto by a plurality of sectional knife clamps 5. In this and other embodiments that will be described hereinafter, the knife 6 is of such a type that it is fixed to a knife holder (such as 6a, 6b, 6c as shown in FIGS. 3, 10, 11, 12) with its cutting edge set properly as measured from the bottom of the holder and secured therewith to the knife carriage 4 so that the cutting edge of the knife is positioned at a predetermined elevation with respect to the carriage. The knife carriage 4 is movable at a variable feed rate by controlled rotation of the lead screws 3a, 3b during veneer peeling operation and it is also shiftable for knife changing between its knife removal position indicated by solid line and the knife installing position depicted by dotted line, as shown in FIGS. 1 and 3. The side frame 2b on the left-hand side as viewed in FIG. 1 has formed therein an access opening 7 through which a knife assembly 6, 6a is passed for changing, as will be described in detail hereinafter.

Adjacent the side frame 2b and outside the lathe A is disposed a frame 8 for supporting thereon part of a knife withdrawing device B for removing an old knife out of the lathe, part of a first knife inserting device C for transferring a new knife into the lathe through the access opening 7 in the side frame 2b, and a second knife inserting device E for moving the new knife to its installing position on the knife carriage 4. Reference symbol D generally designates a knife removing device disposed adjacent the opposite side frame 2a for pushing an old knife away from the knife carriage 4. It is noted that the other parts of the knife withdrawing device B and the first knife inserting device C are provided within the opening 7 in the side frame 2b, as will be described below.

The knife withdrawing device B includes two sets of rolls 10a, 10b which are rotatably mounted on an elongated support member 9 fixed on the frame 8 and extending substantially in alignment with the knife installing position at the front end of the knife carriage 4 when it is located in its knife removal position shown by solid line in FIGS. 1 and 3. The two sets of rolls 10a, 10b are disposed on the support member 9 with the axes of rotation of one set of the rolls, e.g. 10a, directed in substantially perpendicular relation to the axes of rotation of the other set of the rolls, e.g. 10b, as shown in FIG. 3, so that the knife holder 6a carrying an old knife 6 and placed with its front and bottom sides in contact with the rolls 10a, 10b respectively is caused to move by rotation of the rolls. These rolls 10a, 10b are positively driven by a drive (not shown) to rotate in the arrow directions that cause the knife assembly 6, 6a placed on the rolls to move away from the lathe.

The knife withdrawing device B further includes a pair of rolls 16a, 16b which are provided within the access opening 7 in the side frame 2b of the lathe and rotatably mounted on an elongated support member 15 arranged substantially in line with the support member 9. The rolls 16a, 16b are oriented in the same way in respect of the axes of rotation thereof and driven to rotate by any suitable drive (not shown) in the same directions as the rolls 10a, 10b, respectively. A freely rotatable roll 17 is disposed adjacently to the roll 16a with its periphery in facing relation to that of the latter roll, and supported by one end of an L-shaped arm 18 the other end of which is pivotally connected to the support member 15, thus the roll 17 being swingable toward and away from the roll 16a as indicated by double-headed arrow in FIG. 4 about the point at which the above other end of the L-shaped arm 18 is pivotally connected to the support member 15. There is provided an air cylinder 20 whose piston rod is connected to the arm 18 and whose opposite end is pivotally connected to one end of an arm 19 the other end of which is fixed to the support member 15. The roll 17 is normally spaced apart from the roll 16a at a distance, as measured between the peripheral surfaces thereof, that is slightly smaller than the thickness of the knife assembly 6, 6a so that the roll 17 is caused to move resiliently away from its associated roll 16a by the knife assembly coming between the two rolls and then to move back to its original position by the air cylinder when the knife assembly has moved past the same rolls. Thus, this roll arrangement 16a, 16a, 17 cooperates with the rolls 10a, 10b to move a knife assembly away from the veneer lathe.

The first knife inserting device C includes two sets of rotatable rolls 12a, 12b mounted on an elongated support member 11 (FIG. 3) fixed on the frame 8 and disposed extending substantially in alignment with the knife installing position on the knife carriage 4 when it is located in its knife installing position. Like the rolls 10a, 10b of the knife withdrawing device B, the two sets of rolls 12a, 12b are disposed with the axes or rotation of one set of the rolls, e.g. 12a, oriented substantially perpendicularly in relation to the axes rotation of the other set of the rolls, e.g. 12b, so that the knife holder 6a carrying a new knife 6 and placed in contact with the rolls 10a, 10b is transferred by rotation of the rolls. These rolls 12a, 12b are driven by a drive (not shown) to rotate in the arrow directions that cause the knife assembly 6, 6a placed thereon to move toward the lathe.

The first knife inserting device C further includes a roll arrangement which is provided in the side frame 2b of the lathe and similar to that comprised of the rolls 16a, 16b, 17 and the air cylinder 20 of the knife withdrawing device B. That is, the roll arrangement of the first knife inserting device C includes a pair of rolls 28a, 28b rotatably mounted on an elongated support member 27 disposed substantially in alignment with the support member 11, a freely rotatable roll 29 supported by an L-shaped arm 30, an air cylinder 32 connected at its piston rod to the L-shaped arm 30 and at the base to an arm 31 fixed to the support member 27. The rolls 28a, 28b are driven to rotate by any drive (not shown) in the same directions as the rolls 12a, 12b, respectively. The roll 29 is disposed with its periphery in facing relation to that of the roll 28a and normally spaced therefrom at a distance that is slightly smaller than the thickness of the knife assembly 6, 6a, whereby the roll 29 is caused to move resiliently away from its associated roll 28a while compressing air in the cylinder 32 when the knife assembly is moved between the rolls 28a and 29 and also to swing back to its normal position by the air cylinder when the knife assembly has moved past the rolls. Thus, this roll arrangement 28a, 28b, 29 cooperates with the rolls 12a, 12b to convey a knife assembly into the veneer lathe.

Figure 5:
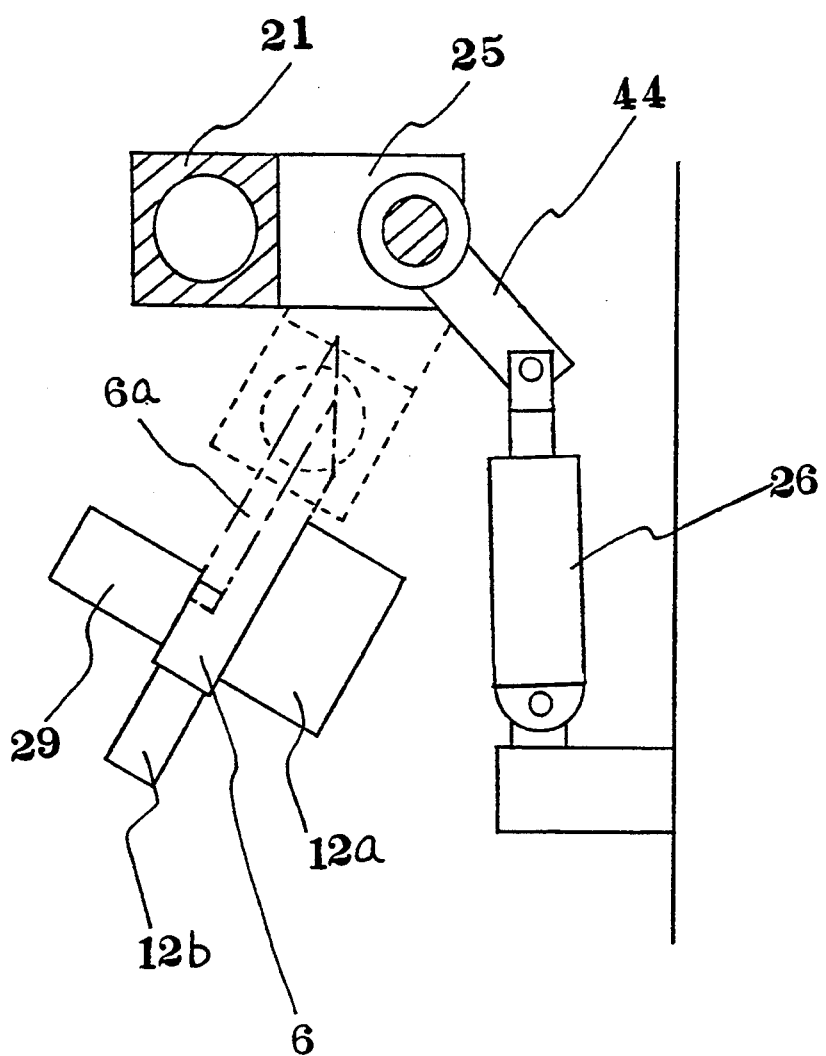
FIG. 5 is a partial cross section of second knife inserting device as seen from line V—V in FIG. 4, also showing the position of a knife being inserted relative to the same device.

The second knife inserting device E comprises a first cylinder 21 which is swingably supported by a pair of bearings 23 by way of end plates 25 fixed to opposite ends of the cylinder and a shaft 24 extending in parallel to the cylinder through the bearings 23 and connected at its opposite ends to the end plates 25. The bearings 23 are mounted on blocks 22 which are in turn fixed to the support frame 8. A second cylinder 26 is mounted on the frame 8 with its piston rod pivotally connected to one end of an arm 44 whose other end is rotatably connected to the shaft 24 so that the first cylinder 21 is reciprocally swung about the shaft by operation of the cylinder 26 between its retracted solid-line position and the operative dotted-line position as shown in FIGS. 3 and 5. In the operative position of the cylinder 21, the tip end of its piston rod is brought behind the trailing end of a knife assembly then partially inserted into the lathe by the first knife inserting device C, so that the knife assembly can be pushed by the piston rod further into the lathe when the first cylinder 21 is actuated. The cylinder 21 is operable so as to extend its piston rod over such a distance of stroke that it places the knife assembly in the aforementioned knife installing position on the knife carriage 4. In the retracted position of the cylinder 21, its piston rod is placed clear of the knife assembly passage defined by the rolls 12a, 12b and 28a, 28b of the first knife inserting device C.

The knife removing device D includes a cylinder 14 held by the right side frame 2a of the veneer lathe and a support member 13. As seen in FIG. 1, the cylinder 14 is arranged with its front end portion located in the side frame 2a and disposed extending substantially in line with the knife assembly when it is released from the clamps 5 of the knife carriage 4. The cylinder 14 has a piston rod movable through a hole 7a formed in the wall of the side frame 2a adjacent the knife carriage 4 for pushing the released knife assembly laterally away from the carriage. The piston rod has a stroke length just enough to bring the knife assembly end remote from the cylinder 14 to a region between the rolls 16a and 17.

Thus, these knife removing and withdrawing devices D, B and first and second knife inserting devices C, E constitute a knife changing apparatus of the veneer lathe A. To protect the knife from possible damages due to contact with hard material, the periphery of all the above rolls and the tip ends of piston rods of the cylinders 14, 21 should preferably be clad with soft material such as rubber, plastic, soft metal, etc. The cladding material for the rolls should desirably have a high coefficient of friction in order to stabilize the movement of the knife assembly.

The following will explain the operation of the above-described knife changing apparatus according to the order of operation.

In removing an old knife, firstly the knife carriage 4 is shifted to its knife dismantling position as shown in FIG. 1, where the knife clamps 5 are released to free the knife assembly 6, 6a from the knife carriage 4. The cylinder 14 of the knife removing device D is actuated to extend its piston rod and, simultaneously, the rolls 16a, 16b and 10a, 10b of the knife withdrawing device B are driven to rotate. By so doing, the knife assembly released from the knife carriage 4 is pushed by the piston rod of the cylinder 14 laterally, or leftward as viewed in FIG. 1, away from the knife carriage 4 until the leading end of the knife assembly is received by the rolls 16a and 17 of the knife withdrawing device B. The knife assembly thus transferred to the knife withdrawing device is moved further by the rolls 16a, 16b and 10a, 10b out of the veneer lathe A. While the knife assembly is being moved out of the lathe, it can be held securely between the two rolls 16a, 17 because the air then compressed in the cylinder 20 urges the roll 17 toward its associated roll 16a. After the trailing end of the knife assembly moves past the roll 16a, the assembly is moved only by the rolls 10a, 10b. The knife assembly coming out of the knife withdrawing device B may be received by any suitable knife carrier located downstream of the device. Alternatively, the rolls 10a, 10b may be stopped when the knife assembly has moved out completely of the lathe.

After the old knife has been thus removed from the lathe, the knife carriage 4 is shifted forward to its knife installing position as shown by dotted line in FIG. 1. Simultaneously, the rolls 12a, 12b and 28a, 28b of the first knife inserting device C are rotated. In so doing, a knife assembly carrying a new knife and previously placed on the rolls 12a, 12b is conveyed rightward by rotation of the rolls. After the knife assembly is received by the paired rolls 28a, 29, it is further moved into the veneer lathe A while being held between its opposite sides by the same rolls. When the trailing end of the knife assembly has moved past the rolls 28a, 29, all the knife inserting rolls are stopped and then the cylinder 26 of the second knife inserting device E is actuated to swing the other cylinder 21 from its upper inoperative position (shown by solid line in FIG. 5) to its lower operative position (shown by dotted line), where the latter cylinder 21 is actuated to extend its piston rod as far as it will go, thereby pushing the knife assembly to the aforementioned knife installing position on the knife carriage 4. With the cylinder 21 operated to retract its piston rod and moved back to its original position, the knife clamps 5 are activated to fasten the knife assembly to the knife carriage 4.

As will be apparent from the foregoing, this method, in which the knife changing is accomplished substantially automatically by moving the knife laterally with respect to the knife carriage by use of a knife changing apparatus disposed on opposite sides of the lathe, can offer an improved efficiency and safety over the conventional method in which the knife changing has been carried out by manually operating lifting equipment to move the knife vertically in both knife dismantling and mounting procedures. Furthermore, because an old knife can be removed from the knife carriage by the knife removing device and a new knife can set properly with respect to the carriage by the second knife inserting device, a workman is not required to enter into the lathe for the knife changing operation.

SECOND EMBODIMENT

Figure 4:
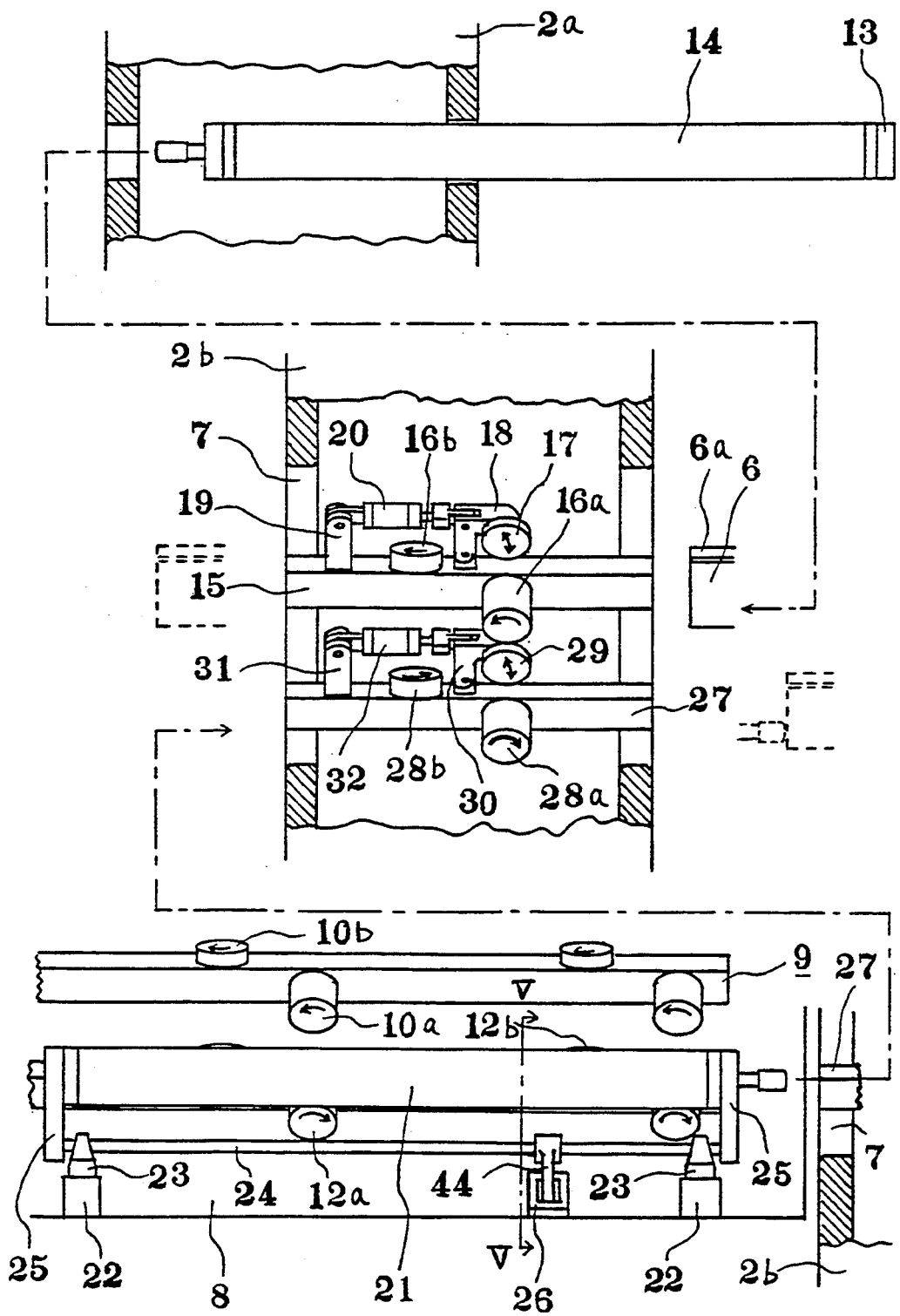
FIG. 4 is an enlarged illustrative plan view of knife removing, withdrawing and inserting devices of the knife changer of FIG. 1.
Figure 7:
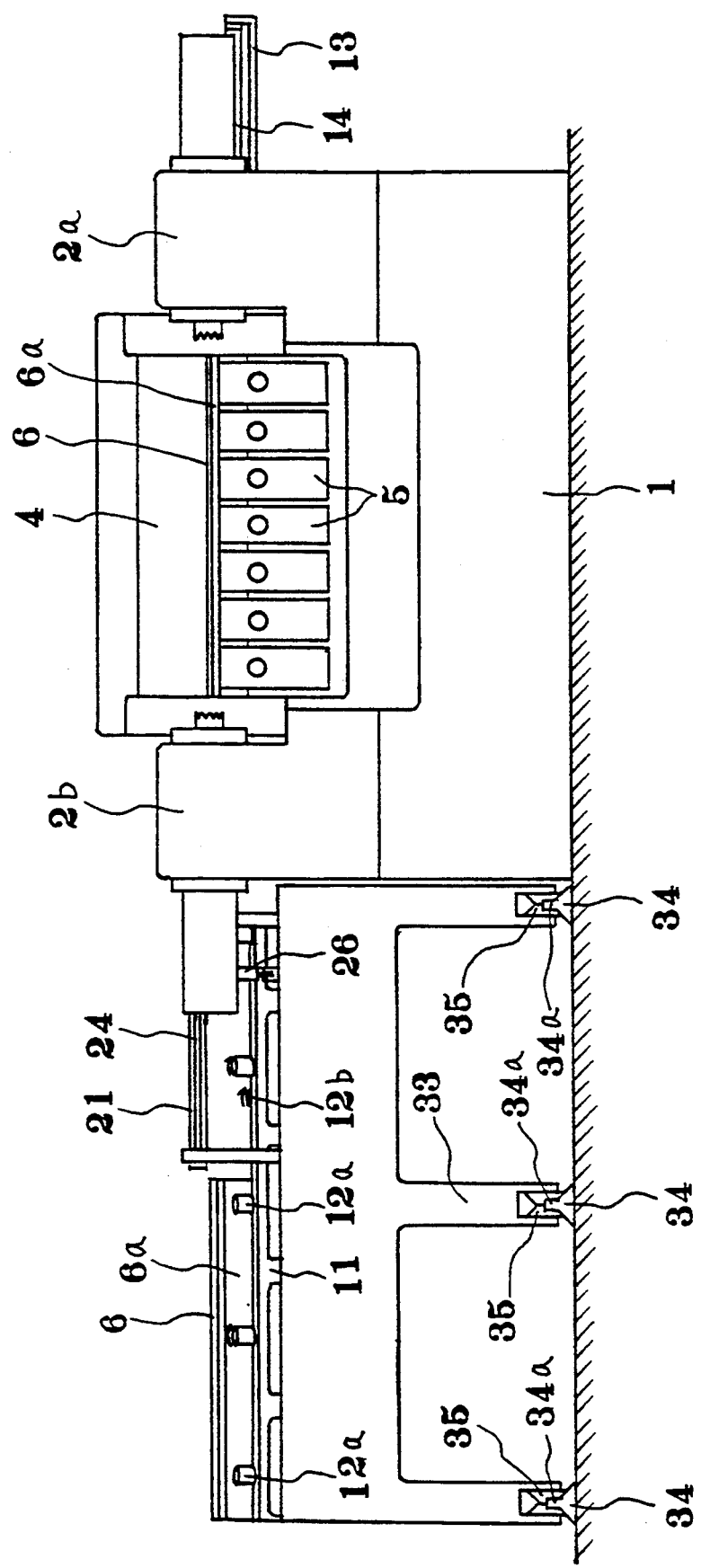
FIG. 7 is a front view of the veneer lathe and the knife changer of FIG. 6.
Figure 8:
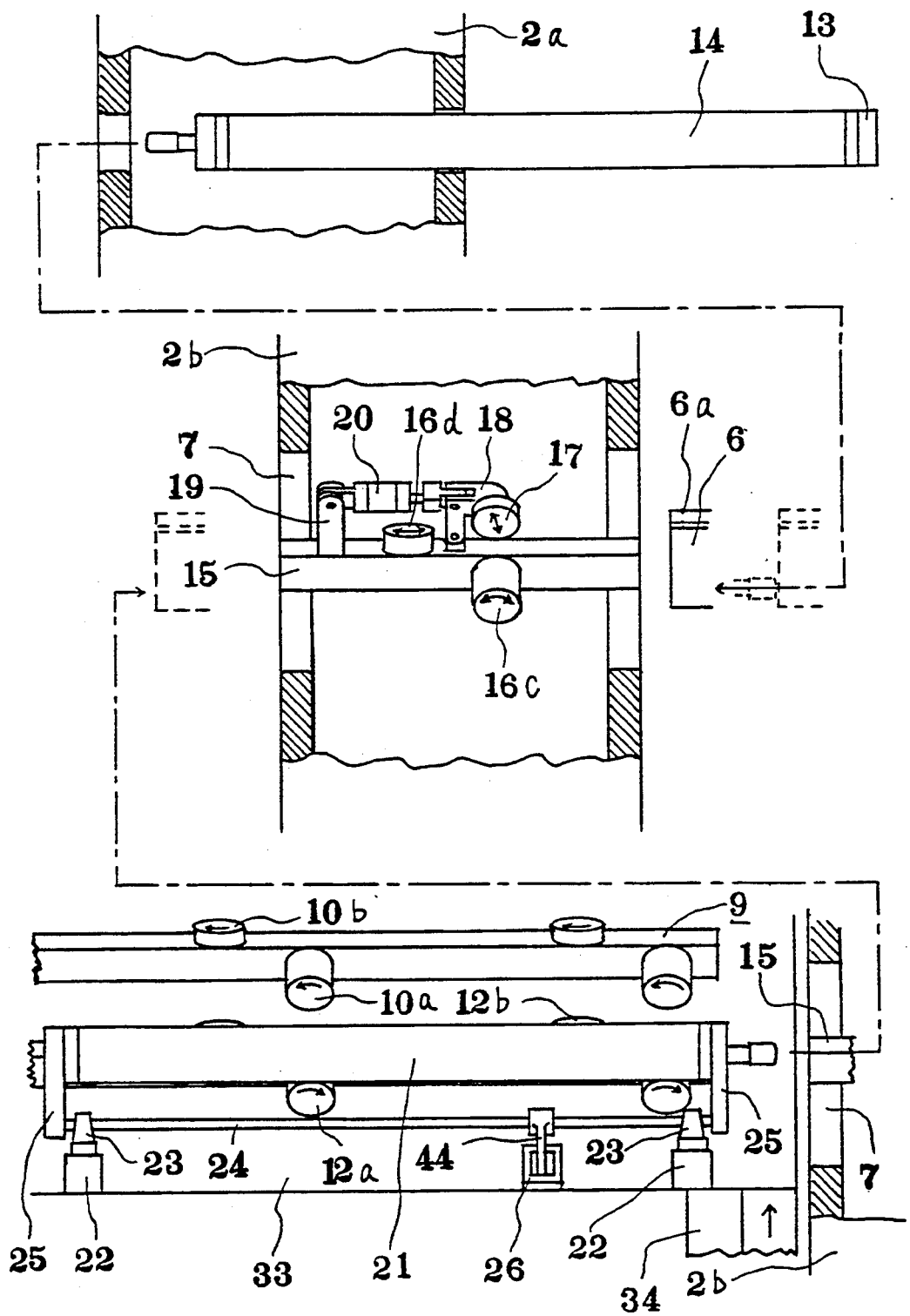
FIG. 8 is an enlarged illustrative plan view showing part of the knife changer of FIG. 6.

The second embodiment of the invention will be described with having reference to FIGS. 6, 7 and 8 that correspond to FIGS. 1, 2 and 4 for the first embodiment, respectively. For the sake of clarity of the description below, like elements or parts are designated by like reference numerals or symbols and, therefore, detailed description of such elements or parts may be omitted.

The veneer lathe differs from that used in the first embodiment in that the knife carriage 4 is adapted to be locatable at a single knife changing position where both knife removal and knife insertion can be accomplished. The knife changing apparatus to perform the method of the second embodiment differs most from the apparatus of the first embodiment in that the stationary frame 8 for supporting thereon the knife withdrawing device B, the first and second knife inserting devices C, E is substituted by a movable frame 33 having a plurality of wheels 35 rolling on rails 34 installed the on the floor in parallel to the side frames 2a, 2b of the veneer lathe. Therefore, the frame 33 is movable along the rails 34 as indicated by double-head arrow in FIG. 6 between its knife removing position shown by solid line where the support member 9 having the knife withdrawing rolls 10a, 10b is placed substantially in alignment with the knife installing position on the knife carriage 4, and the knife inserting position indicated by dotted line where the support member 11 supporting the knife inserting rolls 12a, 12b is placed substantially in line with the above knife installing position on the knife carriage. To limit the movement of the frame 33 between the above two positions, there are provided stops 34a at the opposite ends of each rail 34. Accordingly, the roll assembly 28a, 28b, 29 of the first knife inserting device is omitted and, instead, a roll assembly comprising a pair of rotatable rolls 16c, 16d mounted on the support member 15, the freely rotatable roll 17 and the air cylinder 20 of the knife removing device in the first embodiment is provided as knife transferring device in the side frame 2b of the lathe. It is to be noted, however, that the paired rolls 16c, 16d differ from the rolls 16a, 16b of the first embodiment in that the former rolls are reversibly driven as indicated by double-head arrows in FIG. 8. The second knife inserting device comprising the cylinders 21, 26 and the knife removing device including the cylinder 14 are substantially the same as the counterparts of the knife changing apparatus in the first embodiment.

Figure 6:
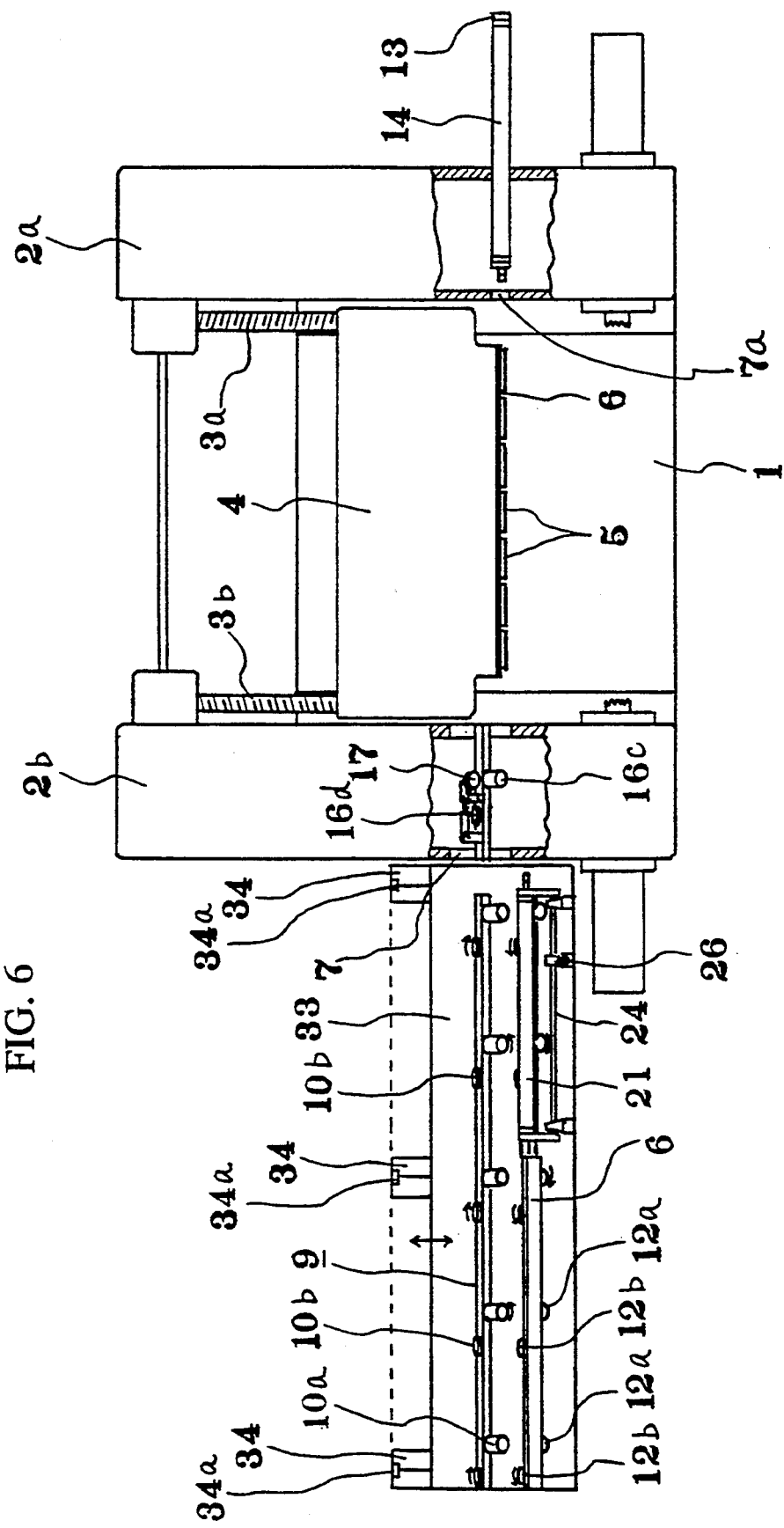
FIG. 6 is a plan view of a veneer lathe and a knife changing apparatus which are used in performing the method according to the second preferred embodiment of the present invention.

In the knife changing operation in this second embodiment, firstly the knife carriage 4 is moved to its knife changing position and the support frame 33 is shifted to its knife removing position as shown in FIG. 6, and the knife assembly on the carriage 4 is released therefrom by undoing the knife clamps 5. Then, the knife withdrawing rolls 10a, 10b and the knife transferring rolls 16c, 16d in the side frame 2b are set into rotation. It is noted that the rolls 16c and 16d are then rotated in counter-clockwise and clockwise direction, respectively, as viewed toward their distal ends. Then, the cylinder 14 is actuated to extend its piston rod, pushing the knife assembly leftward away from the knife carriage 4 until its leading end reaches the paired rolls 16c, 17 to be received and held thereby. The knife assembly is transferred by the rolls 16c, 16d, 17 to the knife withdrawing rolls 10a, 10b, which transports the knife assembly completely out of the lathe.

After the old knife has been thus removed completely from the lathe, the support frame 33 is shifted to its knife inserting position indicated by dotted line in FIG. 6 where the support member 11 supporting the knife inserting rolls 12a, 12b, on which a knife assembly with a new knife was previously placed, is placed substantially in alignment with the support member 15 supporting the transferring rolls 16c, 16d in the side frame 2b. Then, the knife inserting rolls 12a, 12 are rotated and the transferring rolls 16c, 16d are driven in reverse directions, i.e. clockwise and counter-clockwise directions, respectively, to convey the knife assembly into the lathe until the trailing end of the assembly moves clear of the rolls 16c, 17. The cylinder 26 is actuated to move the cylinder 21 to its operative position and then the latter cylinder is operated to extend its piston rod, pushing the knife assembly to the knife installing position on the knife carriage 4. With the cylinder 21 operated to retract its piston rod and the knife clamps 5 activated, the new knife is clamped in place on the knife carriage 4.

This embodiment can offer the same safety and improved efficiency as the first embodiment in the knife changing operation. According to the second embodiment, not only the lathe controlling but also the knife changing apparatus can be simplified over the first embodiment in that the knife carriage 4 may be located only at a single knife changing position and the roll arrangement 28a, 28b and 29 may be dispensed with. On the other hand, however, the movable support frame 33 is more complicated in structure and calls for more space for installation than the stationary frame 8 of the first embodiment.

THIRD EMBODIMENT

The third embodiment of the invention will be described with having reference to FIG. 9.

The veneer lathe in this embodiment has the knife carriage 4 which is adapted to be locatable at a single knife changing position where both knife removal and knife insertion can be accomplished, but differs from that shown in FIG. 6 for the second embodiment in that the right side frame 2a of the lathe has formed therein an access opening 7b through which an old knife is passed for its removal from the lathe. The knife changing apparatus to perform the method of the third embodiment is designed to have a one-way direction of movement of both old and new knives for removal and insertion thereof. For this purpose, the rolls 12a, 12b on the support member 11 of the first knife inserting device and the cylinders 21, 26 of the second knife inserting devices are supported by a stationary frame 8a disposed on the left-hand side of the lathe adjacent the side frame 2b and only the roll arrangement including the rolls 28a, 28b, 29 on the support member 27 of the first knife inserting device is provided in the side frame 2b of the veneer lathe. On the right-hand side of the lathe is disposed the knife withdrawing device comprising the rolls 10a, 10b mounted on the support member 9 fixed to the frame 8b. As seen from a comparison with FIGS. 1 and 6, the cylinder 14 of the knife removing device is omitted. The knife withdrawing device further includes a pair of freely rotatable rolls 37a, 37b mounted on an elongated support member 36 and disposed in the same orientation as the knife withdrawing rolls 10a, 10b, respectively. As seen from FIG. 9, all the elongated support members 11, 27, 36 and 9 carrying the rolls 12a, 12b, 28a, 28b, 37a, 37b and 10a, 10b are arranged substantially in alignment with each other and with the knife installing position of the knife carriage 4 when it is placed in its knife changing position.

As will be understood from the following description of how knife changing is accomplished in this embodiment, the knife transferring rolls 37a, 37b may be dispensed with when the knife to be changed is long enough relative to the spaced interval between the knife carriage 4 and the frame 8b. The roll arrangement 37a, 37b, if used, may be so arranged that the paired rolls are positively driven and further that a nip roll such as the one 17 and resilient means such as the air cylinder 20 used in the first embodiment may be added as required.

Figure 9:
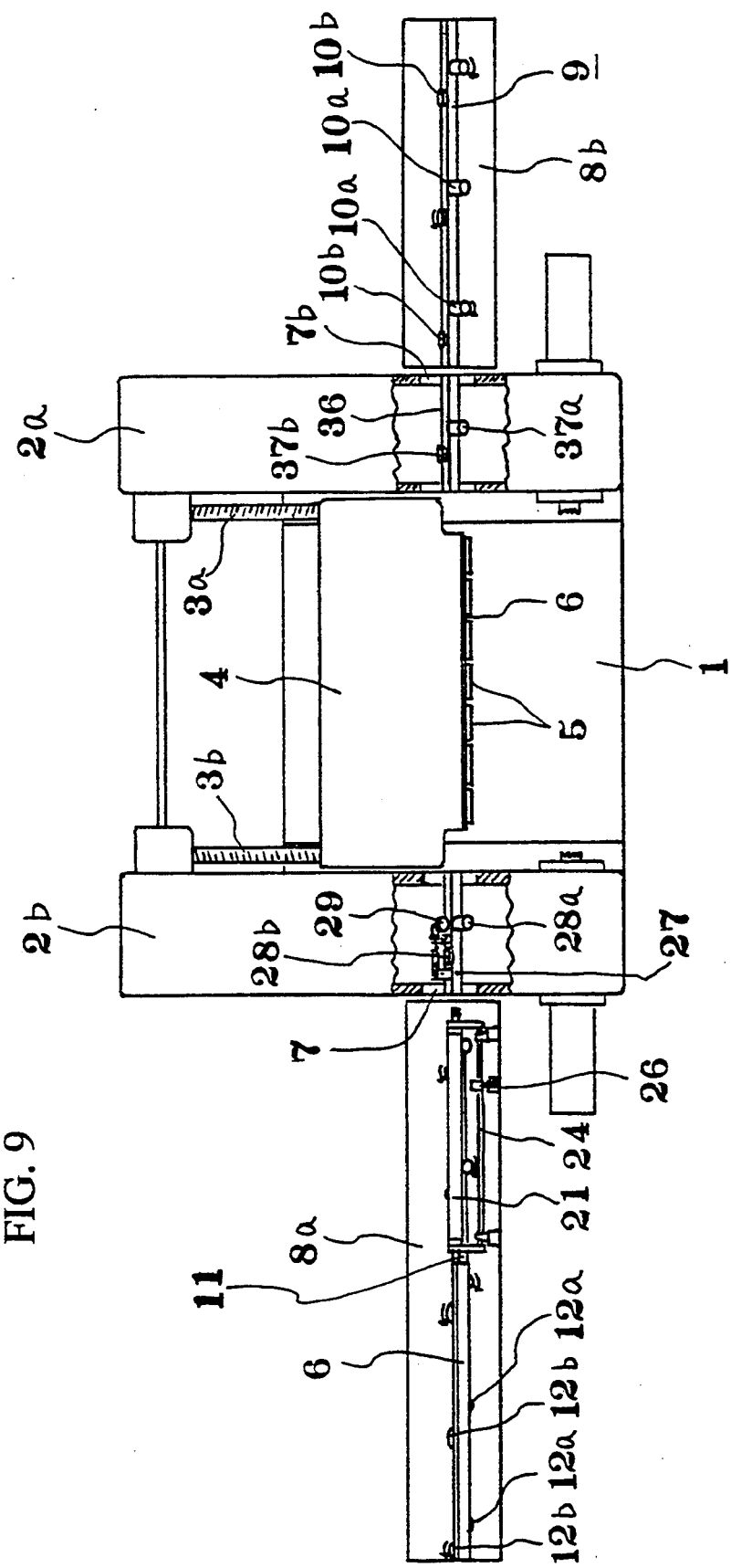
FIG. 9 is a plan view of a veneer lathe and a knife changing apparatus which are used in performing the method according to the third preferred embodiment of the present invention.

In changing an old knife with a new one, firstly the knife carriage 4 is displaced to its knife changing position as shown in FIG. 9, where a knife assembly with the old knife is released from the knife carriage 4. Then, the knife inserting rolls 12a, 12b and the paired rolls 28a, 28b are rotated to convey toward the lathe a knife assembly carrying the new knife and previously placed on the rolls 12a, 12b. After the trailing end of the knife assembly comes clear of the rolls 28a, 29, the cylinder 26 is actuated to move the cylinder 21 to its operative position and then the latter cylinder 21 is operated to extend its pushing piston rod, forcing the knife assembly to the knife installing position on the knife carriage 4. On the other hand, the knife assembly freed from the knife carriage 4 previously is displaced away therefrom by the new knife assembly moving into the lathe and received by the rolls 37a, 37b. Subsequently, the knife assembly is transferred to the knife withdrawing device and moved out of the lathe by rotation of the rolls 10a, 10b. Finally, the new knife assembly placed properly with respect to the knife carriage 4 is secured thereto by operating the clamps 5.

According to the method of this embodiment, the knife changing can be accomplished in a shorter time because insertion of a new knife and removal of an old knife can be performed simultaneously. Additionally, lathe controlling and the knife changing apparatus can be simple because the knife carriage 4 may only be shifted to a single knife changing position and the pushing device such as the cylinder 14 used in the first and second embodiments can be dispensed with. It is noted, however, that spaces are required on opposite sides of the veneer lathe for installation of the knife changing apparatus, thus offering a disadvantage in the space factor.

Figure 10:
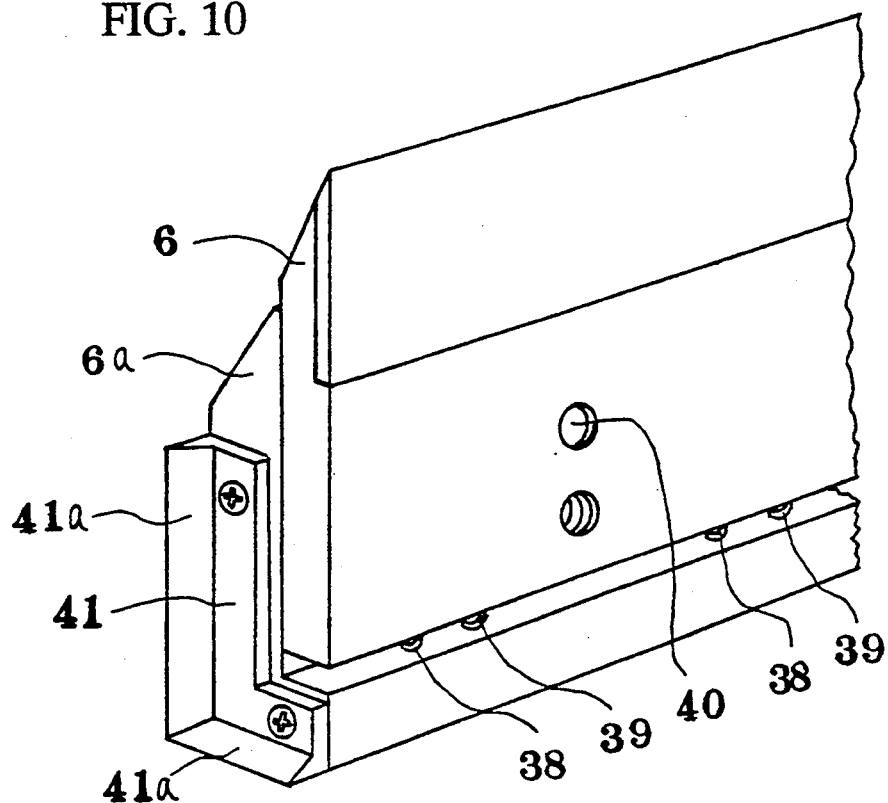
FIG. 10 is a perspective fragmentary view showing a knife assembly comprising a veneer peeling knife and a knife holder equipped with a cleaner for sweeping the knife installing surfaces of the knife carriage to cleans the same surfaces.
Figure 11:
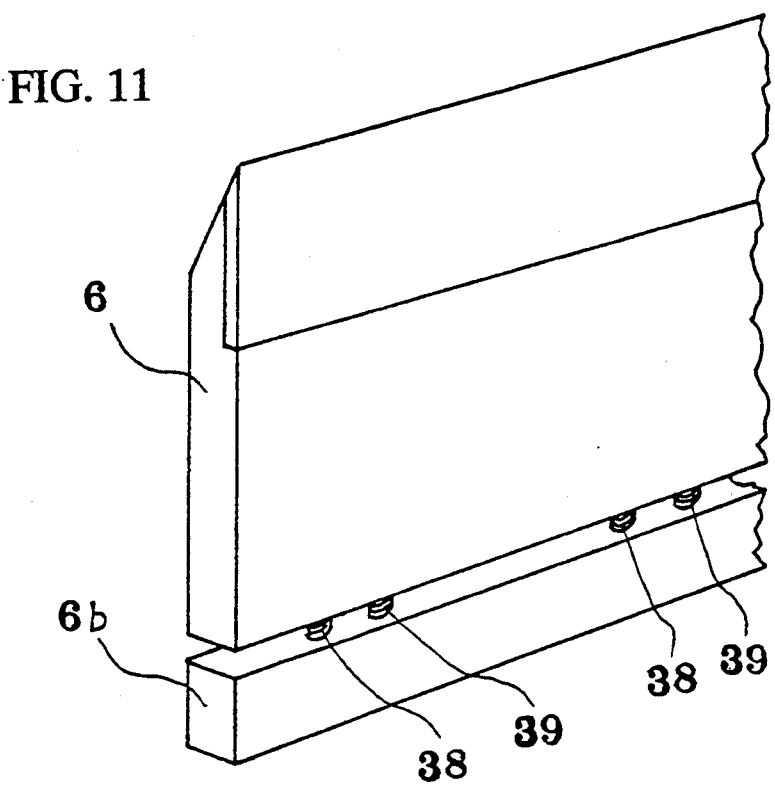
FIG. 11 is a perspective fragmentary view showing another form of knife assembly.
Figure 12:
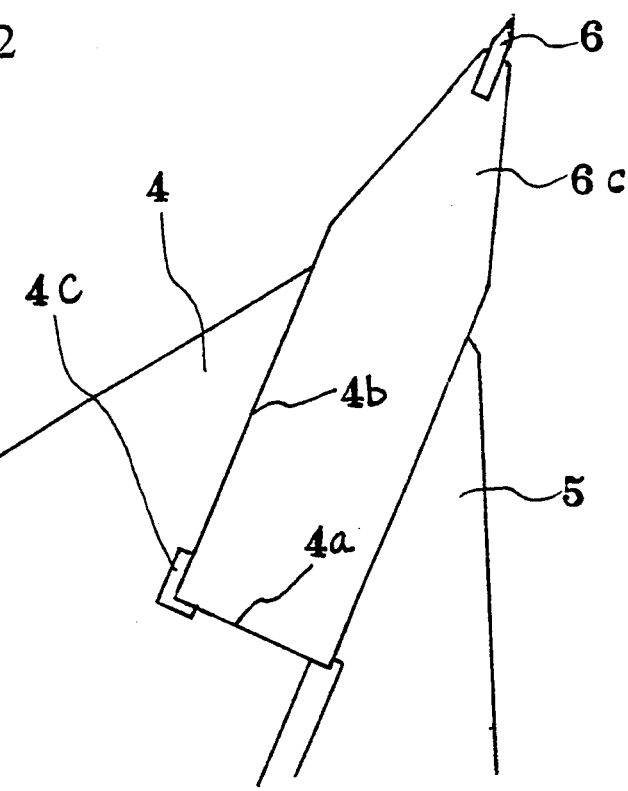
FIG. 12 is a cross sectional view showing still another form of knife assembly as installed in and clamped to a knife carriage of the veneer lathe.

Now referring to FIG. 10 showing the knife assembly used in each of the above-described embodiments, the veneer peeling knife 6 has a regrindable blade and is fixed to the L-shaped knife holder 6a by means of a plurality of set bolts 40 screwed into threaded holes (reference numeral 40 showing the end of one bolt opposite to its head). The knife holder 6a has a plurality of push bolts 38 and pull bolts 39 used for adjusting the elevation and levelness of the cutting edge of the knife 6. The knife may be held by other forms of knife holder, as exemplified in FIG. 11 wherein the knife 6 is held by a square-sectioned bar 6b and supported thereby through the adjusting push bolts 38 and pull bolts 39. Additionally, as shown in FIG. 12, the knife 6 may be of a throw-away type which is press fitted in a knife holder 6c. What counts regarding the knife 6 is that it should be of such a type that, when it is installed in place, e.g. as shown in FIG. 12, its cutting edge is positioned at a predetermined elevation with respect to the knife carriage 4.

Regarding the knife changing apparatus used to perform the method of the present invention, the respective devices of the knife changing apparatus may be provided in various forms different from the above-described specific structures. For example, the knife withdrawing and inserting devices such B and C in FIG. 1 may include additional freely rotatable rolls, such as 17, operable in conjunction with either or both of the rolls 10a, 10b or 12a, 12b so that a knife assembly is held securely from its opposite sides by the rolls thereby to stabilize the knife assembly movement. Alternatively, the knife moving rolls may be substituted with any other suitable means such as conveyer belts disposed so as to transfer the knife assembly in the desired direction. With regards to the freely rotatable and resiliently displaceable rolls, such as 17, 29 in FIG. 1, they may be so arranged that the rolls are shifted to their operative position to engage the knife assembly in response to a signal from any detector representing the arrival of the leading end of the incoming or outgoing knife. The cylinders such as 21, 14 may be replaced with any other convenient pushing devices which are reciprocally operated by any drive so as to displace the knife assembly into or out of the veneer lathe. It is to be also understood that the access opening 7 in the first and second embodiments may be provided by two separate smaller openings through which an old knife and a new knife are passed respectively, and also that, though most of the component parts of the respective devices are provided outside the lathe, some part may be located within the lathe so long as they perform their intended function in the knife changing operation.

To help the knife assembly to move smoothly along the knife installing surface 4a of the knife carriage 4 (shown in FIG. 13) with which the bottom of the knife holder is in sliding contact during knife insertion, that surface may be formed by a replaceable liner plate preferably made of material that is slightly softer than the knife holder. Alternatively, the plate may be substituted with a plurality of rollers.

As understood by those skilled in the art, wood chips, pieces, debris and any other foreign matter present on the knife installing surfaces 4a, 4b (FIG. 13) of the knife carriage 4 may cause the knife to fail to be fixed securely or properly with respect to the carriage, and any moisture on the surfaces 4a, 4b may invite corrosion of the knife. To prevent such troubles, it is customary practiced to clean the knife installing surfaces with compressed air after each appropriate number of times of knife changing. However, the use of the compressed air will just blow wood chips and pieces present not only on the knife installing surface but also in the vicinities of the knife carriage, with the result that part of the wood chips removed by air blowing may fall again onto the knife mounting surfaces. Since the knife assembly is moved linearly along and in sliding contact with the installation surface of the knife carriage in the knife changing method of the invention, the knife assembly itself has the function of sweeping the knife installation surface. In view of such sweeping function, the knife installation surface may be cleaned by the knife assembly moving into the veneer lathe.

Referring back to FIG. 10 to describe one form of cleaning means according to the invention, the knife assembly is provided with a cleaner 41 which is generally L-shaped in conformity with the knife holder 6a and attached to the leading end of the knife holder. The cleaner 41 has tapered portions 41a made of flexible material such as rubber or synthetic resin and protruding laterally outward and sharpened at the tip thereof so that the foreign matter on the knife installing surface of the knife carriage is subjected to sweeping or scraping action of the sharpened tip of the tapered portion. In applying this cleaner to the knife changing apparatus in the third embodiment, it is necessary to make a provision for preventing the flexible portions 41a from being brought into direct contact with the trailing end of the knife assembly being removed from the lathe. For this purpose, any rigid pin may be provided on the leading end of the knife holder 6a of FIG. 10 which projects beyond the tip of the sharpened portions 41a. For better sweeping effect, the flexible portions 41a should preferably be bent slightly outward, i.e. toward the surfaces to be cleaned. It is to be noted that every knife holder does not have to be equipped with the cleaner 41, but using a knife assembly with the cleaner after any predetermined number of times of knife changing can serve the purpose.

Figure 14:
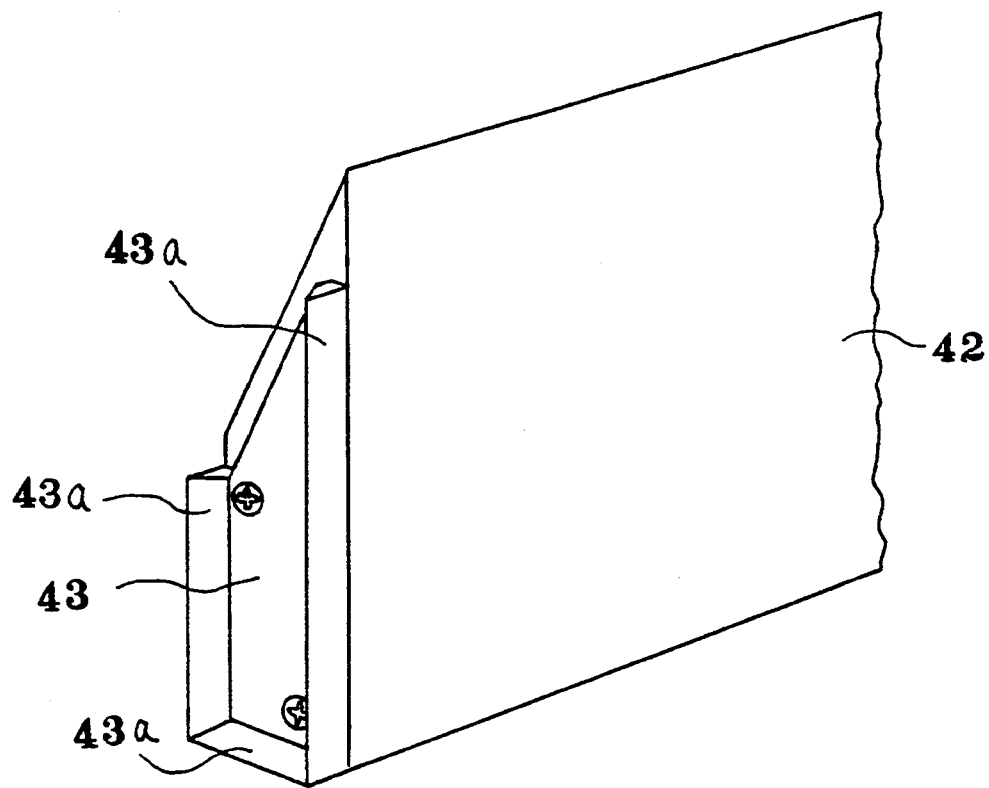
FIG. 14 is a perspective fragmentary view of an independent cleaner which is usable to clean the knife installing surfaces of the knife carriage in the knife changing method of the invention.

Another cleaner 42 is shown in FIG. 14 which may be used for cleaning the knife mounting surfaces. This cleaner 42 is generally configured substantially in conformity with a knife assembly in cross section so that it can be moved into and out of the veneer lathe in the same way as an actual knife assembly is inserted and removed for knife changing by the knife changing apparatuses as described in the above. At the leading end of the cleaner 42 is provided a cleaning member 43 having laterally outwardly projecting tapered portions 43a at three adjoining sides, sharpened at the tips thereof for providing a scraping effect on the knife mounting surfaces of the knife carriage. Cleaning can be accomplished by inserting the cleaner 42 into the lathe and then removing it therefrom by using the knife changing apparatus. This cleaning may be performed after any desired number of times of knife changing. It is noted, however, that the use of this cleaner 42 will lengthen the downtime of the veneer lathe as compared with the use of the cleaner 41 because the cleaning must be carried out independently of the knife changing operation.

Figure 13:
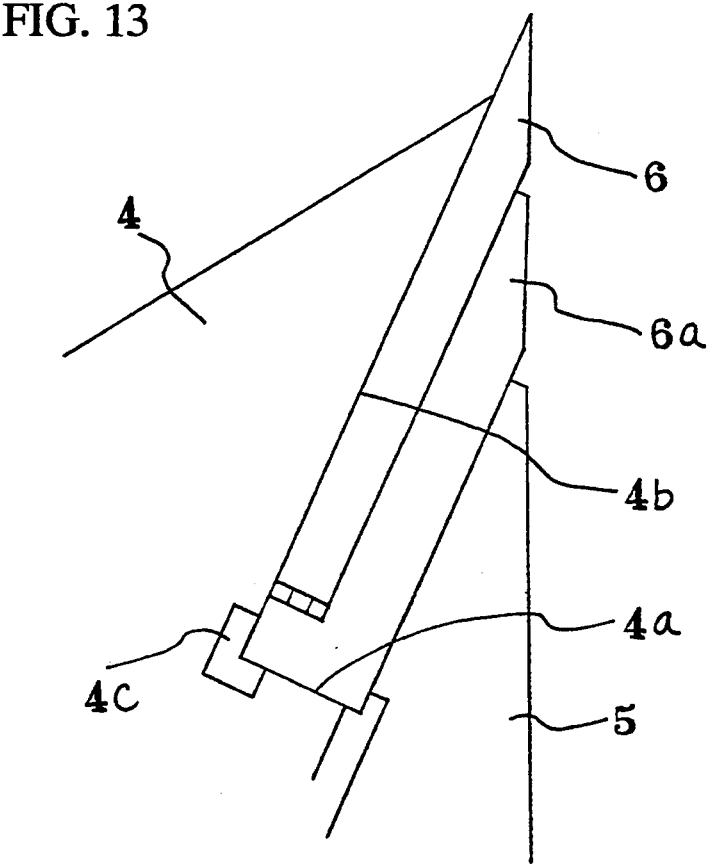
FIG. 13 is a cross sectional view showing the knife assembly of FIG. 10 as installed in and clamped to a knife carriage of the veneer lathe, but with the cleaner removed therefrom.

As shown in FIGS. 12 and 13, a groove 4c may be formed extending throughout the knife carriage length at the inner corner between the two adjoining knife installation surfaces so that wood pieces, if any are present adjacent the corner, are pushed by the knife holder and received in the groove when the knife assembly is finally displaced and fixed in place by the knife clamps 5.

While the invention has been described with reference to the specific embodiments, it is to be understood that the present invention can be practiced with other changes and modifications without departing from the spirit or scope thereof.

What is claimed is:

1. A knife changing method in a veneer lathe equipped with a knife carriage having knife means clamped thereto with the cutting edge of said knife means set at a predetermined elevation with respect to the knife carriage, said knife carriage being shiftable to at least one knife changing position thereof, said veneer lathe having formed therein at least one knife passage adjacent said knife changing position, said method comprising:

shifting the knife carriage to a knife changing position thereof;

unclamping the knife means from the knife carriage where upon said knife means is disposed in a predetermined position on the knife carriage;

moving said knife means from its said predetermined position laterally away from the veneer lathe through a knife passage;

providing new knife means;

moving said new knife means laterally into the veneer lathe through a knife passage to said predetermined position on the knife carriage; and clamping said new knife means to the knife carriage.

2. A knife changing method according to claim 1, wherein each of said knife means and new knife means includes a knife assembly comprising a veneer peeling knife and a knife holder to which the knife is secured such that the cutting edge thereof is set at said predetermined elevation with respect to the knife carriage when said knife assembly is clamped to the knife carriage.

3. A knife changing method according to claim 1, wherein said moving the knife means away from the veneer lathe includes removing the unclamped knife means from the knife carriage and then moving said unclamped knife means laterally out of the veneer lathe.

4. A knife changing method according to claim 1, wherein said moving the new knife means into the veneer lathe includes inserting said new knife means laterally into the veneer lathe and to said predetermined position on the knife carriage.

5. A knife changing method according to claim 1, said knife carriage having at least one knife installation surface with which said knife means is in contact when it is clamped thereto, and said method further comprises providing still another knife means which is equipped with means for cleaning said knife installation surface, and periodically moving said another knife means into the veneer lathe after any desired number of times of knife changing.

6. A knife changing method according to claim 1, said knife carriage having at least one knife installation surface with which said knife means is in contact when it is clamped thereto, and said method further comprises providing cleaning means which is insertable into the veneer lathe through said knife passage to said predetermined position on the knife carriage and equipped at a leading end thereof with a cleaning member contactable with said knife installation surface, and periodically moving said cleaning means into and out of the veneer lathe after any desired number of times of knife changing.

7. A knife changing method according to claim 1, which further comprises shifting said knife carriage from said knife changing position to a knife installing position to receive said new knife means during said moving thereof into the veneer lathe.

8. A knife changing method according to claim 7, wherein said moving of said knife means from its said predetermined position laterally away from the veneer lathe is in one direction, and said moving of said new knife means laterally into the veneer lathe is in direction opposite to said one direction.

9. A knife changing method according to claim 7, wherein said moving of said knife means from its said predetermined position laterally away from the veneer lathe is in one direction, and said moving of said new knife means into the veneer lathe is also in said one direction.

10. A knife changing method according to claim 9 wherein, during said moving of said new knife means, said new knife means engages the first said knife means to induce said moving of the first said knife means from its said predetermined position.

11. A knife changing method in a veneer lathe equipped with a knife carriage having knife means clamped thereto with the cutting edge of said knife means set at a predetermined elevation with respect to the knife carriage, said knife carriage being shiftable between first and second knife changing positions thereof, said veneer lathe having formed therein two knife passages adjacent said first and second knife changing positions, respectively, said method comprising:

shifting the knife carriage to its said first knife changing position;
unclamping the knife means from the knife carriage whereupon said knife means is disposed in a predetermined position on the knife carriage;
moving said knife means from its said predetermined position laterally away from the veneer lathe through one of said knife passages adjacent said first knife changing position;
shifting the knife carriage to its said second knife changing position;
providing new knife means;
moving said new knife means laterally into the veneer lathe through the other of said knife passages adjacent said second knife changing position to said predetermined position on the knife carriage; and
clamping said new knife means to the knife carriage.

12. A knife changing method in a veneer lathe according to claim 11, wherein said moving the knife means away from the veneer lathe includes removing the unclamped knife means laterally from the knife carriage and out of the veneer lathe.

13. A knife changing method in a veneer lathe according to claim 11, wherein said moving the new knife means into the veneer lathe includes inserting said new knife means laterally into the veneer lathe and then moving said new knife means laterally to said predetermined position on the knife carriage.

14. A knife changing method in a veneer lathe according to claim 11, said veneer lathe being equipped with a pair of side frames one of which has both of said knife passages formed therethrough.

15. A knife changing method in a veneer lathe equipped with a knife carriage having knife means clamped thereto with the cutting edge of said knife means set at a predetermined elevation with respect to the knife carriage, said knife carriage being shiftable to a knife changing position thereof, and a knife changing apparatus disposed outside the veneer lathe and shiftable between first and second positions thereof with respect to the veneer lathe, said veneer lathe having formed therein a knife passage adjacent said knife changing position of the knife carriage, said method comprising:

shifting the knife carriage to its said knife changing position;
shifting the knife changing apparatus to its said first position;
unclamping said knife means from the knife carriage whereupon said knife means is disposed in a predetermined position on the knife carriage;
moving said unclamped knife means from its said predetermined position laterally away from the veneer lathe through said knife passage and on to said knife changing apparatus;
shifting the knife changing apparatus to its said second position;
removing said knife means from said knife changing apparatus and providing new knife means on said knife changing apparatus;
shifting the knife changing apparatus to its said first position;
moving said new knife means laterally into the veneer lathe through said knife passage to said predetermined position on the knife carriage; and
clamping said new knife means to the knife carriage.

16. A knife changing method in a veneer lathe according to claim 15, wherein said moving the knife means away from the veneer lathe includes removing the unclamped knife means laterally from the knife carriage and out of the veneer lathe.

17. A knife changing method in a veneer lathe according to claim 15, said veneer lathe being equipped with a pair of side frames one of which has said knife passage formed therethrough.

18. A knife changing method in a veneer lathe equipped with a knife carriage having knife means clamped thereto with the cutting edge of said knife means set at a predetermined elevation with respect to the knife carriage, said knife carriage being shiftable to a knife changing position thereof, said veneer lathe having formed in opposite sides thereof the respective of two knife passages each adjacent said knife changing position of the knife carriage, said method comprising:

shifting the knife carriage to its said knife changing position;

unclamping the knife means from the knife carriage whereupon said knife means is disposed in a predetermined position on the knife carriage;

providing new knife means;

moving said new knife means laterally into the veneer lathe through one of said knife passages to said predetermined position on the knife carriage and, simultaneously, moving the first-said knife means from its said predetermined position and through the other of said knife passages out of the lathe; and clamping said new knife means on the knife carriage.

19. A knife changing method in a veneer lathe according to claim 18, wherein said simultaneously moving the first-said knife means is accomplished by pushing the first said knife means by said new knife means being moved into the veneer lathe.

20. A knife changing method in a veneer lathe according to claim 18, said veneer lathe being equipped with a pair of side frames each having one of said knife passages formed therethrough.

* * * * *